(12) United States Patent
Cath et al.

(10) Patent No.: US 7,608,188 B2
(45) Date of Patent: Oct. 27, 2009

(54) VACUUM ENHANCED DIRECT CONTACT MEMBRANE DISTILLATION

(75) Inventors: Tzahi Y. Cath, Reno, NV (US); V. Dean Adams, Reno, NV (US); Amy E. Childress, Reno, NV (US)

(73) Assignee: Board of Regents of the Nevada System of Higher Education, Reno, NV (US)

( * ) Notice: Subject to any disclaimer, the term of this patent is extended or adjusted under 35 U.S.C. 154(b) by 286 days.

(21) Appl. No.: 11/293,407

(22) Filed: Dec. 2, 2005

(65) Prior Publication Data

US 2006/0144788 A1 Jul. 6, 2006

Related U.S. Application Data

(60) Provisional application No. 60/633,334, filed on Dec. 3, 2004.

(51) Int. Cl.
*B01D 61/00* (2006.01)
*B01D 61/36* (2006.01)
*B01D 63/00* (2006.01)
*C02F 1/04* (2006.01)

(52) U.S. Cl. .................. 210/640; 210/321.6; 210/257.2

(58) Field of Classification Search ........................ None
See application file for complete search history.

(56) References Cited

U.S. PATENT DOCUMENTS

| | | | | |
|---|---|---|---|---|
| 4,875,980 | A * | 10/1989 | Arita et al. | ..................... 203/14 |
| 5,098,575 | A | 3/1992 | Yaeli | |
| 5,464,540 | A * | 11/1995 | Friesen et al. | ................ 210/640 |
| 6,299,777 | B1 * | 10/2001 | Bowser | ....................... 210/640 |
| 6,391,205 | B1 | 5/2002 | McGinnis | |
| 6,645,380 | B2 * | 11/2003 | Baig et al. | ................ 210/321.6 |
| 6,849,184 | B1 | 2/2005 | Lampi et al. | |

FOREIGN PATENT DOCUMENTS

| | | |
|---|---|---|
| WO | WO 02/060825 A2 | 8/2002 |
| WO | WO 2005/012185 | 2/2005 |
| WO | WO 2005/017352 | 2/2005 |
| WO | WO 2005/120688 | 12/2005 |
| WO | WO 2006/120399 | 11/2006 |

OTHER PUBLICATIONS

"Crossing Boundaries in Pursuit of Future Solutions," Sweden Today, p. 37, No. 2, 2006; file dated Aug. 7, 2006.

(Continued)

*Primary Examiner*—Krishnan S Menon
(74) *Attorney, Agent, or Firm*—Ryan A. Heck; UNR-DRI Technology Transfer Office

(57) ABSTRACT

The present disclosure provides methods and systems for purifying an impaired liquid. In a particular example, the disclosure provides methods and systems for purifying water containing a solute. A feed stream of solute containing water is introduced in a flow chamber. A permeate stream of water at least substantially free of the solute is placed in the flow chamber. A hydrophobic membrane is placed between the feed stream and the permeate stream. A vacuum is applied to the permeate stream. A vapor pressure differential causes water to vaporize from the feed stream, pass through the hydrophobic membrane, and condense in the permeate stream.

23 Claims, 15 Drawing Sheets

OTHER PUBLICATIONS

Giorgini; International Search Report from PCT/GB2004/003450; Sep. 22, 2004.

Goers; International Search Report from PCT/GB2004/003242; Oct. 18, 2004.

Liu and Martin, "Applying Membrane Distillation in High-Purity Water Production for Semiconductor Industry," Royal Institute of Technology Presentation, KTH, Stockholm, Sep. 30, 2005.

Liu, "Polygeneration of Electricity, Heat, and Ultra Pure Water for Semiconductor Industry," file created Apr. 23, 2003.

U.S. Appl. No. 11/295,807, filed Dec. 6, 2005, Cath et al.

Mootz; International Search Report from PCT/GB2005/002307; Aug. 24, 2005.

Pankratz, Water Desalination Report, vol. 43, No. 23, 4 pp., Jun. 18, 2007.

Park; Written Opinion and International Search Report from PCT/US2007/071141; Nov. 5, 2007.

Reports and Articles summary page, downloaded from http://www.xzero.se/en/reports.html; dated Aug. 14, 2006.

Tillberg, "ZLD Systems—An Overview," presented at the Royal Institute of Technology, KTH, Stockholm, 2004; file dated Dec. 19, 2005.

XZero Company Brochure, file dated Jun. 5, 2006.

Bradbury, "Water Filters Rely on Nanotech," pp. 1-3 downloaded from http://www.wired.com/print/science/discoveries/news/2004/10/65287 on Jul. 3, 2007.

Cath, et al., "Experimental Study of Desalination Using Direct Contact Membrane Distillation: a New Approach to Flux Enhancement," *Journal of Membrane Science* 228:1-16, 2004.

Cath, et al. "Forward Osmosis: Principles, Applications, and Recent Developments," *Journal of Membrane Science* 281:70-87, (2006).

Cath, et al., "Membrane Contactor Processes for Wastewater Reclamation in Space Part I. Direct Osmotic Concentration as Pretreatment for Reverse Osmosis," *Journal of Membrane Science* 257:85-98, (2005).

Cath, et al., "Membrane Contactor Processes for Wastewater Reclamation in Space II. Combined Direct Osmosis, Osmotic Distillation, and Membrane Distillation for Treatment of Metabolic Wastewater," *Journal of Membrane Science* 257:111-119, (2005).

McCutcheon, et al., "A novel ammonia-carbon dioxide forward (direct) osmosis desalination process," *Desalination* 174:1-11, (2005).

Schofield et al., "Factors Affecting Flux in Membrane Distillation," *Desalination* 77:279-294 (1990).

Schofield et al., "Gas and Vapour Transport Through Microporous Membranes. II. Membrane Distillation," *Journal of Membrane Science* 53:173-185 (1990).

\* cited by examiner

US 7,608,188 B2

VACUUM ENHANCED DIRECT CONTACT MEMBRANE DISTILLATION

CROSS REFERENCE TO RELATED APPLICATION

This application claims the benefit of, and incorporates by reference, U.S. Provisional Patent Application No. 60/633,334 filed Dec. 3, 2004.

TECHNICAL FIELD

The present disclosure relates to methods and systems for membrane distillation. Certain embodiments provide methods and systems for direct contact membrane distillation using a vacuum applied to at least a portion of a distillation system.

BACKGROUND

As the demand for water has grown, industry has long sought processes for the desalination of salt water, such as seawater or brackish water. Two such processes are distillation and membrane processes. Membrane processes include reverse osmosis (RO), nanofiltration (NF), and electrodialysis (ED).

For membrane based methods, increased production rates are typically sought by developing new and improved membranes or by improving recovery of energy in existing desalination processes. Water recovery is a major economic parameter of drinking water production. However, this parameter is typically limited in existing processes. In addition to limited water recovery, another drawback is that these processes are typically considered energy intensive. Membrane fouling and scaling in pressure-driven membrane processes (e.g., in RO and NF) are often a major area of concern, as they can increase the cost of operating and maintaining the systems. In addition, because most membranes processes rely on an osmotic draw solution, increasing salt content typically reduces the flux of product water in existing processes due to the lower osmotic potential difference at higher salt concentrations.

Membrane distillation (MD) is a membrane process that has been investigated in small-scale laboratory studies. Mass transfer in MD is typically controlled by the vapor pressure difference across a microporous hydrophobic membrane—vapor, rather than liquid, diffuses through the pores of the membrane and the vapor condensate is the product water. MD technology has not commonly been used for commercial desalination, however, because of the low fluxes of water through the membrane typically achieved.

SUMMARY

In one aspect, the present disclosure provides methods and systems for distilling liquids. According to one embodiment, a membrane is placed in between a feed stream of impaired liquid and a permeate stream. In a particular implementation, the impaired liquid is water containing a solute and the permeate stream of liquid with a lower solute concentration than the feed stream, including a permeate stream free or substantially free of solute. In a more particular implementation, the feed stream is water having a solute dissolved therein and the permeate stream is purified water. In a particular example, the feed stream is salt water and the permeate stream is desalinated or substantially salt-free water.

In a further aspect, the feed solution can be under positive or neutral pressure. The permeate solution flows under vacuum. Accordingly, a portion of the feed solution vaporizes, passes through the pores of the membrane, and condenses in the permeate stream.

In particular implementations, the vacuum applied to the permeate side of the system is between about 0.05 and about 1.0 atmospheres, absolute. In even more particular implementations, the vacuum applied to the permeate side is between about 0.5 and about 1.0 atmospheres, absolute. In a particular example, the pressure applied to the feed solution is between about 1.0 and about 3.0 atmospheres, preferably between about 1.0 and about 1.5 atmospheres, more preferably about 1.0 atmosphere.

In at least one embodiment, the feed and permeate solutions can run co-currently in a flow cell containing the membrane. In an alternative embodiment, the feed and permeate solutions run countercurrently in the flow cell.

According to a further aspect of the disclosure, the temperature of the feed solution can be higher than the temperature of the permeate solution. In one implementation, the temperature of the feed solution is at least 5 degrees Celsius higher than the temperature of the permeate solution. In further implementations, the temperature of the feed solution is at least 10 degrees Celsius higher than the temperature of the permeate solution. In a particular example, the temperature of the feed solution is about 40° C. and the temperature of the permeate solution is about 20° C.

In at least one embodiment of the present disclosure, the membrane is hydrophobic. In particular implementations, the membrane is made from Teflon (polytetrafluroethylene) or polypropylene. In particular implementations, the membrane has pore sizes of about 0.03 to about 0.5 microns, such as membranes having pore sizes of about 0.2 to about 0.45 microns. The membrane may have a single layer or multiple layers. In certain examples, the membrane has at least one active layer and at least one support layer.

The membrane may be formed in a number of shapes and disposed in a variety of configurations. In a particular configuration, the membrane is flat. In a particular implementation, the flat membrane is placed in a flow cell. In particular examples, the membrane is held in place using fasteners or adhesives, such as by clamps, clasps, screws, pins, tape, glue, or clips.

In other implementations, the membrane is held in place by pressure or friction, such as by sandwiching it between portions of the flow cell. In a further example, the membrane may be kept from collapsing when vacuum is applied to the permeate or feed solution by fluid pressure on a permeate side and a feed side of the flow cell. In another example, the flat membrane is secured between two plates. In a more particular example, a frame (or gasket) is placed between a plate and the flat membrane. The frame may have flow ducts and flow channels to conduct the permeate solution or feed solution proximate the membrane.

In another embodiment, the flow cell includes a plurality of membranes and frames. Each membrane is abutted by a frame having flow ducts and flow channels conducting the permeate solution or the feed solution. The flow channels of each frame alternate carrying feed or permeate streams such that each membrane is abutted on one side by a frame with flow channels conducting feed solution and abutted on the other side by a frame with flow channels conducting permeate solution.

In another aspect, the flow cell may be a pressure vessel containing an envelope formed from a rolled, flat membrane, thus creating a plurality of membrane layers inside the pressure vessel. At least a portion of the membrane layers are abutted by spacers. The spacers may have solid portions for providing support to the membrane layers and hollow portions for conducting fluid. In a particular implementation, the spacers are mesh, such as plastic mesh. In another implementation, the spacers are plastic rods. In yet another implementation, the spacers are solid plastic blocks with channels formed therein.

In another aspect, the flow cell includes one or more membrane covered cassettes. In particular implementations, a support is included in the cassette to support the membranes. For example, the support may be a porous spacer, such as a mesh or rod with channels formed therein. In particular examples, the porous spacer is made of plastic. Each cassette includes one or more inlets and outlets for conducting a first solution. The cassettes are placed in a tank containing a second solution. The second solution may be introduced into the tank by a suitable inlet, such as a perforated tube. The second solution may be removed from the tank by an outlet. In one embodiment, the first solution is a feed stream and the second solution is a permeate stream. In a further embodiment, the first solution is a permeate stream and the second solution is a feed stream.

In certain implementations, feed and permeate solutions are introduced into respective feed channels and permeate channels through central inlets extending though the center of the envelope. The feed solution and permeate solution are conducted though the envelope on opposite sides of the membrane and are carried out of the envelope through outlets coupled to the periphery of the envelope. When the envelope is charged with feed and permeate solutions, a portion of the feed solution will vaporize in the feed channels, pass though the membrane, condense in the permeate solution in the permeate channels, and exit the envelope through a permeate outlet.

In another aspect of the present disclosure, both the permeate and feed cycles of a system having a flow cell containing a membrane are placed under vacuum. In at least one embodiment feed and permeate solutions run co-currently in the flow cell. In an alternate embodiment, the feed and permeate solutions run countercurrently in the flow cell. In a particular implementation, the vacuum applied to the permeate cycle and feed cycles is between about 0.05 and about 1.0 atmospheres. In a particular example, the vacuum applied to the permeate and feed cycles is between about 0.25 and about 0.75 atmospheres.

The methods and systems of the present disclosure may be applied in a variety of ways. Disclosed systems operated under partial vacuum can be referred to as vacuum enhanced direct contact membrane distillation ("VEDCMD") systems. The VEDCMD systems can be used to remove salt from water, such as from seawater or brackish water. The disclosed VEDCMD systems and methods can present a number of advantages compared to previous desalination techniques.

For example, as previously noted, salt content has great effect on the flux of typical reverse osmosis systems, but very little effect on at least certain disclosed VEDCMD systems. Even at high salt concentrations, at least certain disclosed VEDCMD systems result in high salt rejection, such as higher than 98%.

An advantage of some of the disclosed VEDCMD systems is that they can be operated at comparatively little cost. For example, only a small temperature differential (for example, 10° C.) results in substantial flux in disclosed VEDCMD systems. The VEDCMD systems may be combined with a waste heat source, such as power plant or factory, to provide the desired temperature differential.

In addition, VEDCMD systems can, in certain embodiments, involve lower capital costs. For example, the VEDCMD systems may be operated with low pressure pumps. These low pressure pumps can be less expensive to purchase and maintain than the high pressure pumps typically used in reverse osmosis systems.

In addition, in at least certain embodiments, the VEDCMD systems have reduced membrane fouling compared to other membrane systems. For example, foulants are typically not pushed into the pores of the membranes because of the relatively low pressures used. Maintenance costs involved in removing and replacing membranes may be reduced in the disclosed systems because of the durability of the membranes.

In addition to treatment of water with dissolved sodium chloride, water containing other salts or inorganic solutes may be desalinated using the methods and systems of the present disclosure. For example, water contaminated with heavy metals arsenic or other containments can be subjected to the disclosed distillation techniques, thus providing cleaner water and a more concentrated feed stream. The more concentrated feed stream may lead to more efficient subsequent purification or storage.

In certain embodiments, various types of wastewater may be purified using the disclosed systems and methods. In certain applications, human waste fluids may be purified and the recovered water reused. For example, on long space voyages it is impractical to bring along enough pure water to last for the duration of the voyage. Disclosed distillation systems and methods can provide both a way to provide fresh water and for reducing the volume of waste created during the voyage. In this regard, the disclosed systems can be particularly useful in this application because the vapor pressure of urea is very low; therefore urea does not typically cross the membranes used in the disclosed systems.

The disclosed systems and methods can be applied in the food industry, among others. For example, the disclosed distillation systems may be used to concentrate beverages, such as soft drinks and juices, for later reconstitution. Foods such as soups may be similarly concentrated. A variety of useful concentrates may be prepared using disclosed systems and methods, such as converting tomato juice to ketchup. Certain embodiments can be more energy efficient, produce less waste, and produce a higher quality product than previous preparation methods.

Disclosed embodiments can be used in the biotechnical and biochemical fields in extracting, purifying, or concentrating various items of interest. For example, many biological substances, such as cells, proteins, and microorganisms, are sensitive to pressure or temperature. Because of the mild temperatures and pressures that can be used in certain embodiments of the disclosed systems and methods, these biological substances can be safely concentrated, extracted, or purified.

Although many of the disclosed systems and methods are described using aqueous feed and permeate solutions, any suitable liquid may be used, and the permeate may be other than water vapor. For example, the disclosed systems and methods may be used to strip volatile organic compounds from water.

There are additional features and advantages of the subject matter described herein. They will become apparent as this specification proceeds.

In this regard, it is to be understood that this is a brief summary of varying aspects of the subject matter described herein. The various features described in this section and below for various embodiments may be used in combination or separately. A particular embodiment need not provide all features noted above, nor solve all problems or address all issues in the background noted above.

BRIEF DESCRIPTION OF THE DRAWINGS

The description herein makes reference to the accompanying drawings wherein like reference numerals refer to like parts throughout the several views, and wherein:

In FIG. 13(a) the salt source is NaCl and in FIG. 13(b) the salt source is sea salt.

DETAILED DESCRIPTION

As used herein, the singular forms "a," "an," and "the" refer to one or more than one, unless the context clearly dictates otherwise. As used herein, the term "includes" means "comprises."

Figure 1:
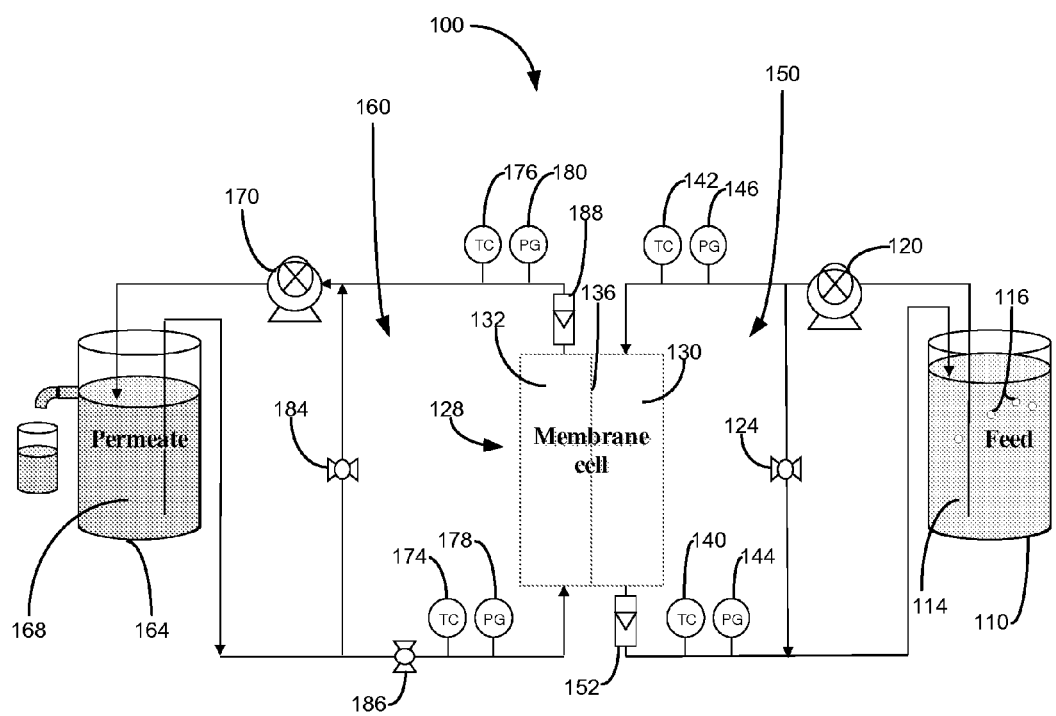
FIG. 1 is a diagram illustrating a vapor enhanced direct contact membrane distillation system according to an embodiment of the present disclosure.

With reference to FIG. 1, a vacuum enhanced direct contact membrane distillation (VEDCMD) system 100 is shown having a feed source 110 containing a feed solution 114, such as an impaired liquid. As used herein, an impaired liquid refers to a liquid having an undesired substance, such as a solute, dissolved gas, organic compound, or co-solvent. In a particular example, one or more solutes 116 are dissolved in the feed solution 114. When the system 100 is used for desalination, the impaired liquid may be seawater or brackish water. Although the feed source 110 is shown as an isolated tank, any suitable feed source 110 can be used, such as a feed stream from another system or from an intake in communication with a feed source, such as a body of water, for example, an ocean.

The feed solution 114 optionally may be pumped through a pump 120, which may be configured to control the flow rate or to apply positive or negative pressure, as desired. The pump 120 may also be used to cause the feed stream to flow on a membrane 136. One suitable pump 120 is the model 1605A pump, available from Procon Pumps of Murfreesboro, Tenn. The flow rate may be further controlled using a valve 124.

The feed solution 114 is transported from the feed source 110 to a flow cell 128. The flow cell 128 has a feed side 130 and a permeate side 132. The membrane 136 is disposed between the feed side 130 and the permeate side 132. The flow cell 128 may be constructed from any suitable material, including polymers. In particular example, the flow cell 128 is formed from acrylic.

The membrane 136 is preferably a hydrophobic membrane. Microporous hydrophobic membranes 136 are particularly preferred. The microporous hydrophobic membrane 136 may have pores of any suitable size, however pore sizes of about 0.03 to about 0.5 microns are presently preferred, pore sizes of about 0.2 to about 0.45 microns are particularly presently preferred.

The membrane 136 may be made from one or more suitable hydrophobic materials, such as hydrophobic polymers. Generally, more hydrophobic membranes are preferred. Preferred membranes are also relatively thinner and more porous. Exemplary membranes 136 may be constructed from Teflon or polypropylene (PP).

The membrane 136 may have one layer or multiple layers. For example, the membrane 136 may have one or more active layers and one or more support layers. In a particularly preferred embodiment, the membrane 136 has a thin polytetrafluroethylene (PTFE) active layer and a polypropylene (PP) support sublayer. For membranes 136 having an active layer and a support layer, the active layer typically is positioned facing the feed side 130 of the flow cell 128. Suitable hydrophobic microporous membranes may be obtained from Osmonics Corp. of Minnetonka, Minn. Suitable membranes and their properties are summarized in Table 1 below.

| Membrane | Material | Nominal pore size (μm) | Porosity (%) | Thickness (μm) | Active layer thickness (μm) |
|---|---|---|---|---|---|
| PS22 | PP | 0.22 | 70 | 150 | 150 |
| TS22 | PTFE | 0.22 | 70 | 175 | 5-10 |
| TS45 | PTFE | 0.45 | 70 | 175 | 5-10 |
| TS1.0 | PTFE | 1.0 | 70 | 175 | 5-10 |

Although the membrane 136 is shown as flat, other shapes and configurations may be used for the membrane 136. For example, a flat membrane 136 may be encased, or otherwise supported, in order to help make the membrane 136 more robust.

In at least one embodiment, the flow cell 128 is constructed such that the membrane 136 is held in place in the flow cell 128 by friction or pressure, such as being sandwiched between the feed side 130 and the permeate side 132 of the flow cell 128. However, other means of securing the membrane 136 could be used, such as various fastening or adhesive means, such as tape, glue, clamps, clasps, clips, pins, or screws. Fluid pressure may be used to help keep the membrane 136 from collapsing when vacuum is applied to the feed side 130 or the permeate side 132 of the flow cell 128. The flow cell 128 is preferably constructed to ensure that the membrane 136 does not collapse during operation.

Because temperature and pressure can affect the flux of permeate passing from the feed side 130 to the permeate side 132 of the flow cell 128, thermocouples 140, 142 and pressure gauges 144, 146 may be included on the output and input sides, respectively, of the feed cycle 150. A flow meter 152 is located on the output end of the feed side 130 of the flow cell 128.

Turning now to the permeate cycle 160, permeate passing through the membrane 136 condenses into a permeate stream 168 and is conducted to a permeate reservoir 164. The permeate reservoir 164 is shown as a discrete tank, but the permeate reservoir 164 could be other types of reservoirs. The permeate reservoir 164 could also be a transport device for carrying the permeate solution 168 to another system or location. The permeate solution 168 is typically a solution containing less solute (is more dilute) than the feed solution 114. When the permeate 168 is water, the permeate stream is preferably distilled water, de-ionized water, potable water, runoff water, or other water having a relatively low amount of total dissolved solids. I In particular examples, a relatively low amount of total dissolved solids is less than about 1,000 mg/l of total dissolved solids, such as less than about 500 mg/l. In a more particular example, the amount of total dissolved solids in the permeate stream is an amount that, when mixed with water crossing the membrane 136, produces a product water having a concentration of total dissolved solids of less than about 500 mg/l. In a presently preferred example, the concentration of total dissolved solids in the permeate 168 is between about 200 mg/l and about 500 mg/l.

The permeate loop 160 includes a vacuum pump 170 for placing the permeate side 132 of the flow cell 128 under vacuum, which may be lower than ambient pressure or lower than the pressure of the feed loop 150. The pump 170 may also cause the permeate solution 168 to flow over the membrane 136. The vacuum pump 170 may be of any suitable type to produce the range of pressures desired, typically between 0.1 and 1.0 atmospheres, preferably between about 0.5 about 1.0 atmospheres. One suitable pump 170 is the model 1605A pump, available from Procon Pumps of Murfreesboro, Tenn.

As with the feed loop 150, the permeate loop 160 may be provided with thermocouples 174, 176 and pressure gauges 178, 180 at the input and exits ends, respectively, of the flow cell 128 in order to monitor or control the pressure or temperature of the permeate loop 160. A bypass valve 184 is provided to assist in controlling the pressure of the permeate loop 160. A front valve 186 is located proximate the input end of the permeate side 132 of the flow cell 128 to provide further control of the flow rate of the permeate solution 168 and the pressure of the permeate cycle 160. A flow meter 188 is provided at the output of the permeate side 132 of the flow cell 128.

According to a particular method of the present invention, the system 100 is operated while applying a vacuum to the permeate cycle 160. In a particular implementation, the vacuum may be any pressure less than atmosphere pressure. In a further implementation, the vacuum may be any pressure less than the pressure of the feed loop 150. The temperature of the feed solution 114 is typically maintained higher than the temperature of the permeate solution 168, such as at least about 5 degrees higher, such as at least 10 degrees higher.

For water based feed solutions 114 and permeate solutions 168, greater temperature differentials between the feed solution 114 and the permeate solution 168 generally result in higher flux across the membrane 136. Increased feed solution 114 temperature generally increases the flux across the membrane 136 due the increased vapor pressure of the feed solution. Increased vacuum (lower pressure) on the permeate cycle 160 also typically increases the flux across the membrane 136.

In operation, relatively warmer feed solution 114 enters the feed side 130 of the flow cell 128. Vapor from the feed solution 114 enters the pores of the membrane 136 and flows to the permeate side 132 of the flow cell 128. The permeate vapor condenses into the permeate solution 168 and is carried out of the flow cell 128 for recovery. The system 100 is typically run as a continuous process.

Figure 2:
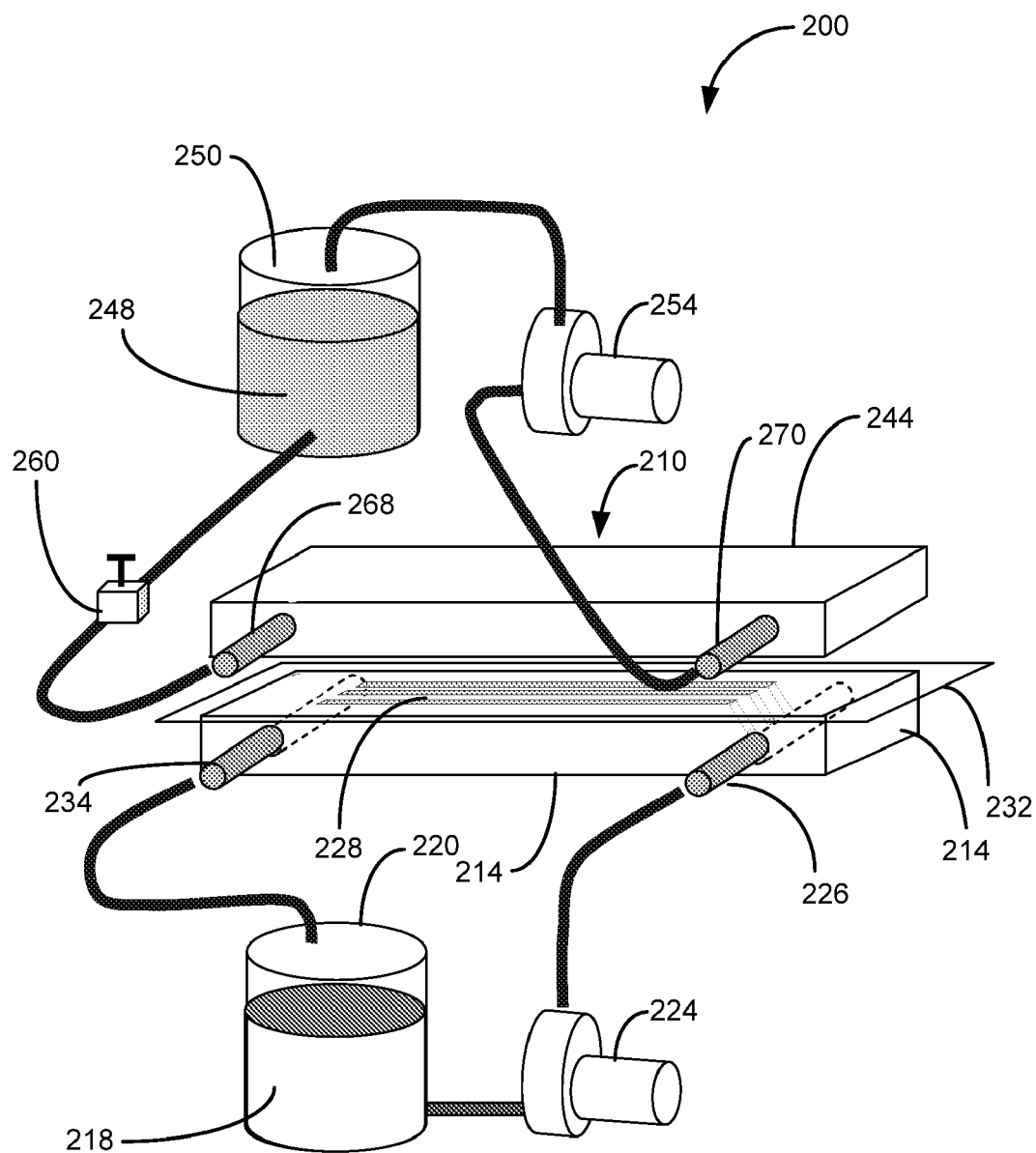
FIG. 2 is a diagram illustrating a flow cell that may be used in the system of FIG. 1.

FIG. 2 is a detailed view of a system 200 including a flow cell 210 that may be used in the VEDCMD system 100 of FIG. 1. The flow cell 210 has a feed compartment 214 that receives a feed solution 218 from a feed tank 220. A pump 224 is used to control the flow of the feed solution 218.

The feed solution 218 enters the feed compartment 214 through an inlet port 226. Narrow channels (not shown in FIG. 2) are used to transport the feed solution 218 to flow channels 228 formed in the feed compartment 214. In at least one embodiment, the flow channels 228 have a width of between about 1 and about 5 millimeters. The flow cell 210 is preferably designed to have the feed solution 218 flowing with a high Reynolds number. In addition, the flow cell 210 is preferably designed such that high turbulence (reflected by the high Reynolds number) may be achieved at relatively low pressure (for example, 30-40 psi). In addition, the feed solution 218 preferably is used to provide support for a membrane 232 so that the membrane 232 does not collapse during operation of the system 200. After passing through the flow channels 228, the feed solution 218 passes out of the flow cell 210 through an outlet port 234.

The flow cell 210 has a permeate (product) compartment 244 which abuts the feed compartment 214. The membrane 232 is positioned between the permeate compartment 244 and the feed compartment 214. In certain embodiments, the membrane 232 is a flat sheet membrane. In particular embodiments, the membrane 232 is supported by fluid on the both sides of the flow cell 210. However, other support means or affixing means could be used, if desired, to secure the membrane 232 in position, such as adhesive or fastener means, including tape, glue, screws, clips, clasps, clamps, or pins.

A permeate solution 248 is stored in a permeate tank 250. A pump 254 and a valve 260 can be used to control the flow velocity of the permeate solution 248 and the pressure of the permeate cycle. The permeate compartment 244 is constructed similarly to the feed compartment 214, including the arrangement and construction of flow channels (not shown). The permeate solution 248 enters the permeate compartment though an inlet 268 and exits the permeate compartment though an outlet 270.

Figure 3:
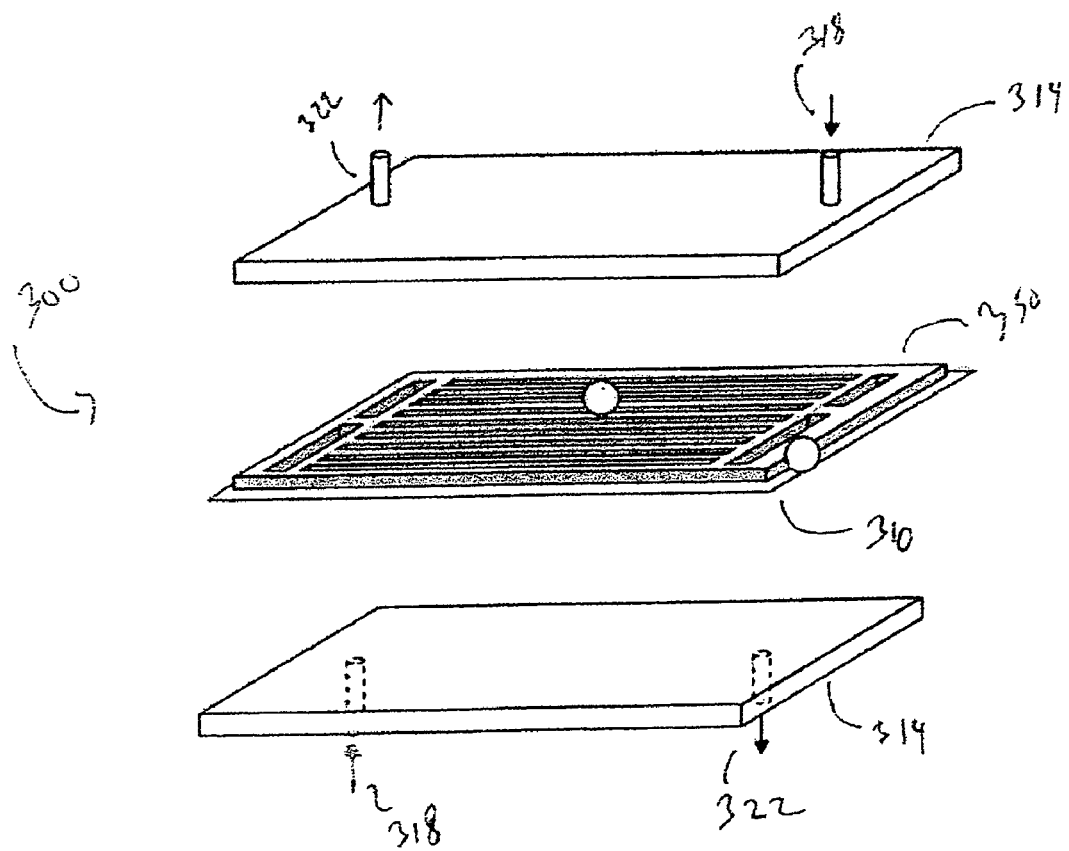
FIG. 3 is a diagram illustrating a flow cell having a plate, a frame, and a membrane that may be used in the system of FIG. 1.

As stated above, the flow cell 210 may be constructed in a variety of ways. Certain flows cells use encased membranes. For example, as shown in FIG. 3, a membrane 310 may be encased between two plates 314. The plates 314 have inlet ports 318 and outlet ports 322 for conducting feed and permeate solutions into and out of the flow cell 300. The plates 314 thus provide support for the membrane 310.

A gasket (or frame) 350 may be inserted between one or more of the plates 314 in order to direct the flow of the feed solution or permeate solution in the flow cell 300. The gasket 350 may also provide support for the membrane 310 and increase the amount of contact between the feed or permeate streams and the membrane 310. The gasket 350 may be made from any suitable material, such as various polymers, and preferably does not chemically interact with the stream with which it is in contact.

Figure 4:
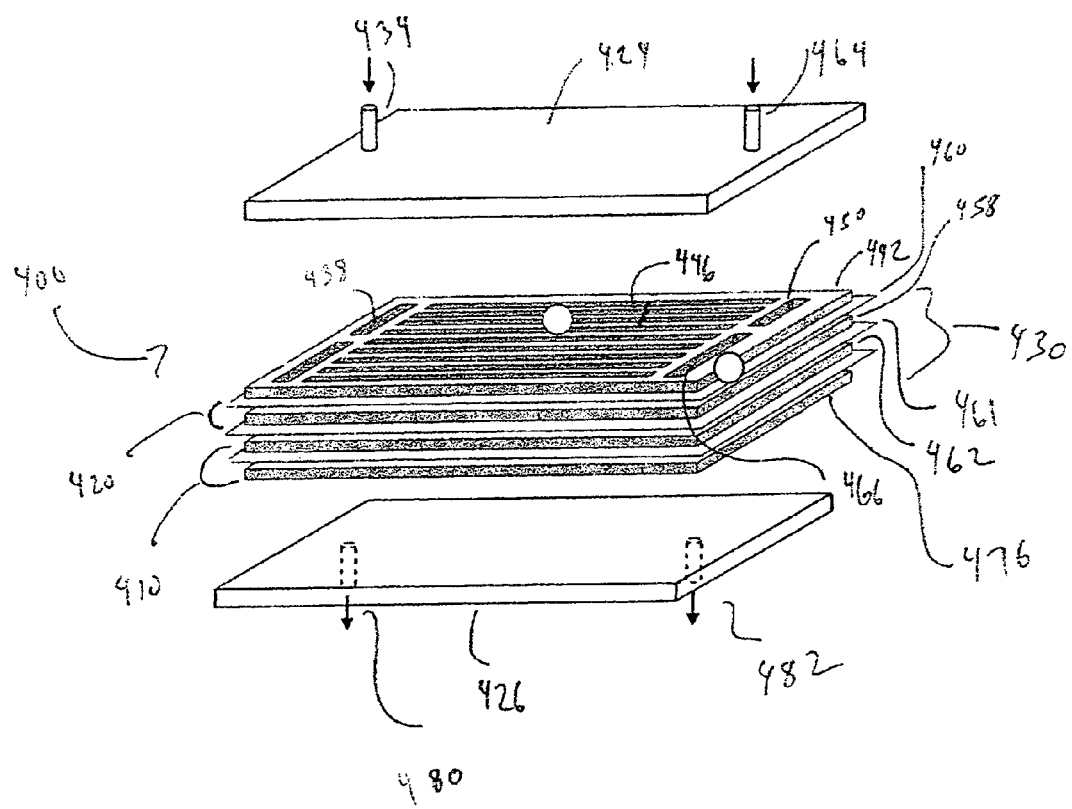
FIG. 4 is a diagram illustrating a flow cell having a stack of frames and membranes between two plates that may be used in the system of FIG. 1.

Turning now to FIG. 4, a number of gaskets 410 and membranes 420 may be included between two plates 424, 426 in order to form a stack 430. In operation, feed solution enters the flow cell 400 through an inlet port 434 formed in the plate 424. The feed solution will flow through a flow duct 438 of a gasket 442 and then into flow channels 446 of the gasket 442.

The flow channels 446 are preferably constructed such that high turbulence (such as indicated by a relatively large Reynolds number, such as a Reynolds number of at least about 2300, for example, a Reynolds number of at least about 5000) can be achieved at relatively low pressure (for example, 30-40 psi). The flow channels 446 also are preferably constructed to provide support for the membranes 420. In at least one embodiment, the flow channels 446 have of width of between about 1 mm and about 5 mm. Of course, the construction of the flow cell 400, including the dimensions and orientation of the flow channels 446, the turbulence achieved, and the operational pressure can be varied according to the needs of a particular application.

After flowing through the flow channels 446 of the gasket 442, the feed solution enters a flow duct 450 in the gasket 442, passes through an opening (not shown) in a membrane 460, and enters a flow duct (not shown, at least substantially congruent with the flow duct 450) in a gasket 458. The solution will then be conducted, without passing through the flow channels (not shown, at least similar to flow channels 446) in the gasket 458, through an opening in a membrane 461 and into a flow duct in a gasket 462. The feed solution will flow through the flow channels (not shown) in the gasket 462.

A permeate solution enters the flow cell 400 through an inlet 464 in the plate 424 and into a flow duct 466. From the flow duct 466, the permeate solution is directed through a corresponding opening (not shown) in the membrane 460 and into a flow duct (not shown, at least substantially congruent with the flow duct 466) of the gasket 462. The permeate solution will be conducted into flow channels (not shown, at least similar to flow channels 446).

The feed and permeate solutions continue to flow in this way through all of the membranes 420 and the gaskets 410 in the stack 430. The permeate and feed solutions thus flow through alternate gaskets 410. The membranes 420 are oriented such that if the membrane 410 has an active surface, the active surface is facing the feed stream.

After passing through the last gasket 476, the permeate and feed streams exit the flow cell 400 through outlet ports 480, 482. In this way, the flow cell 400 provides multiple distillations in each pass of the feed and permeate streams through the flow cell 400.

Figure 5:
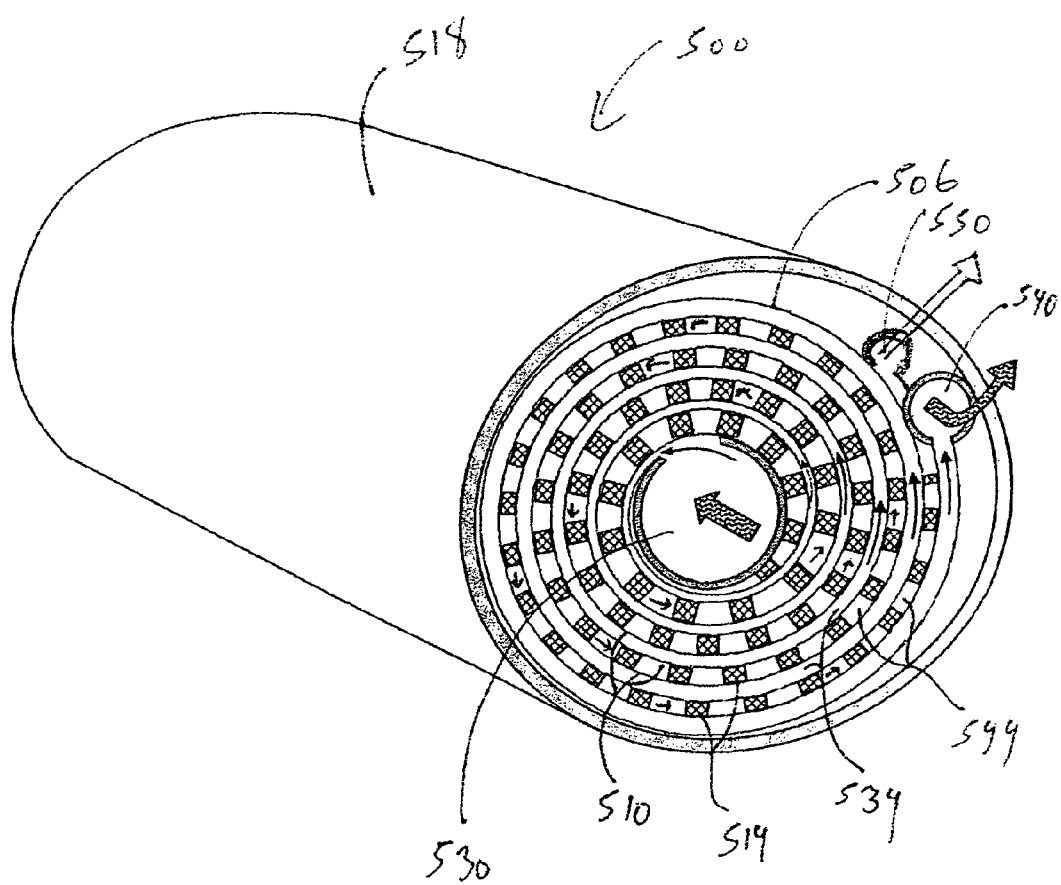
FIG. 5 is a diagram illustrating a flow cell having a membrane envelope inside of a pressure vessel that may be used in the system of FIG. 1.

An alternate flow cell 500 is illustrated in FIG. 5. An envelope 506 of membranes layers 510 and supports 514 is inserted in a pressure vessel 518. The envelope 506 is formed by rolling a flat membrane, thus forming the membrane layers 510. The supports 514 are included between each membrane layer 510. The supports 514 provide support for the membrane layers 510, allowing fluid to flow on both sides of each membrane layer 510 and allowing the envelope 506 to be used under vacuum.

The supports 514 may be of any suitable size, number, shape, and dimension, made of any suitable material, and placed in any suitable location. In one embodiment, the supports 514 are made of mesh, preferably plastic mesh. In another embodiment, the supports 514 are plastic rods. The supports 514 are preferably porous solids in order to provide structural support to the membrane layers 510 while allowing fluid to flow between the supports 514. When permeate solution flows between the supports 514 and feed solution flows on the other side of each membrane layer 510, distillation can occur across each membrane layer 510.

The feed stream can be introduced into the envelope 506 by a central inlet tube 530. From the central inlet tube 530, the feed solution is introduced into the feed channels 534 between the membrane layers 510 through holes (not shown) formed in the walls of the central inlet tube 530, such as drilled holes. After passing through the channels 534, the feed solution exits the envelope 506 though an outlet 540.

In a similar manner, the permeate stream can be introduced into permeate channels 544 containing the supports 514 though an inlet (not shown). After passing though the permeate channels 544, the permeate stream exits the envelope 506 through an outlet 550.

Figure 6:
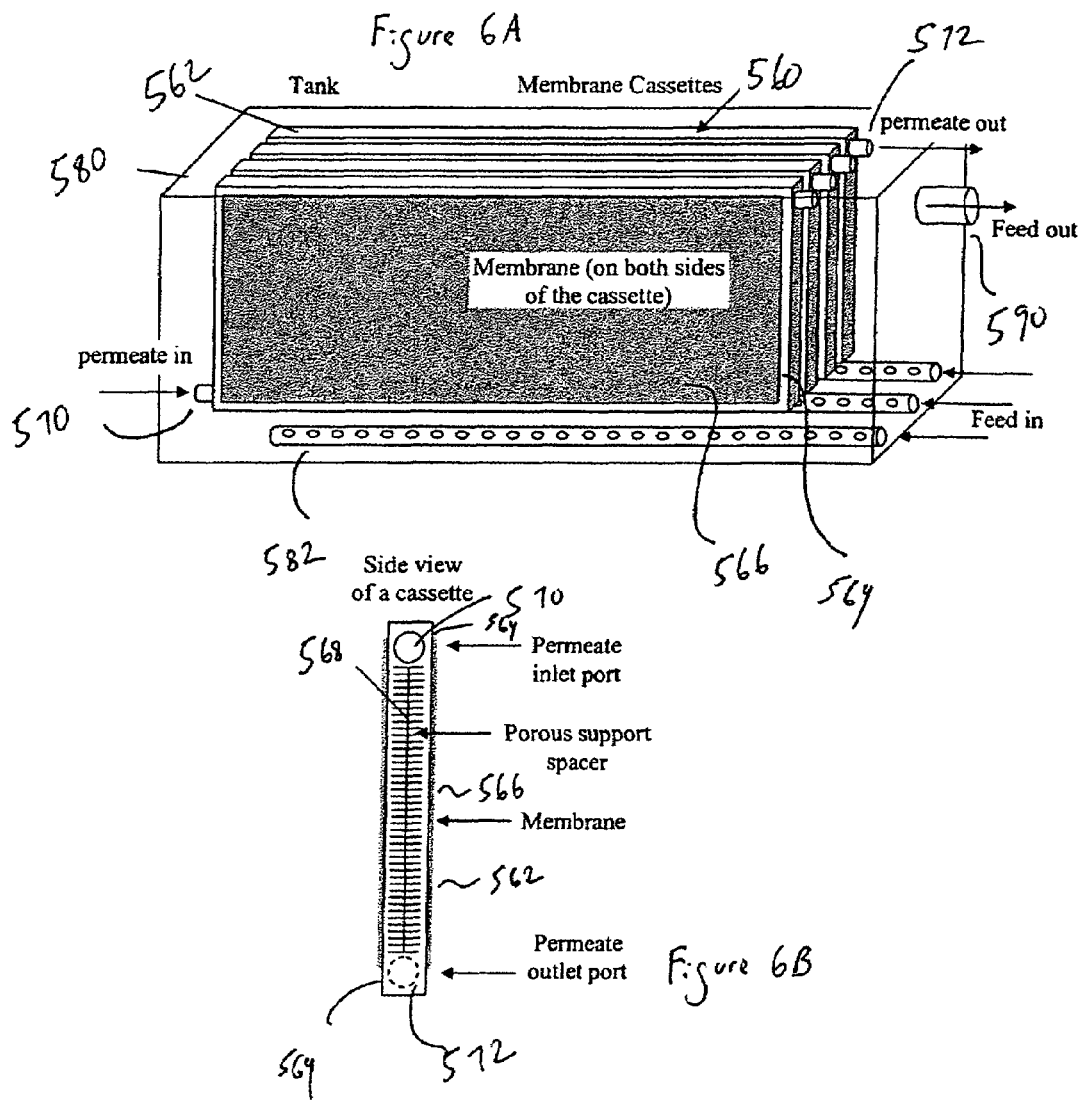
FIGS. 6(a) and 6(b) are diagrams illustrating a flow cell having one or more membrane covered cassettes immersed in a tank that may be used in the system of FIG. 1.

Another alternate flow cell 560 is illustrated in FIGS. 6A and 6B. One or more cassettes 562 are covered on both faces 564 with a flat sheet membrane 566 appropriate for membrane distillation. A porous support spacer 568 is placed inside the cassette 562 between the two membranes 566. The spacer 568 provides support for the membrane layers 566, allowing fluid to flow on both sides of each membrane layer 566 and allowing the cassette 562 to be used under vacuum.

Each cassette 562 has one or more inlet ports 570 allowing permeate water to flow into the cassette 562. Each cassette 562 also has one or more outlet ports 572 to allow permeate and product water to flow out of the cassette 562. The flow inside the cassette 562 is under negative pressure (vacuum). The cassette (or cassettes) 562 is immersed in a tank 580 containing feed water. Although the cassettes 562 and membranes 566 are shown as rectangular, other sizes and shapes of cassettes and membranes could be used, such as square, round, or semi-circular cassettes and membranes. In addition, each cassette may have more than two faces 564. In particular implementations, the membranes 566 are secured to each cassette 562, such as by an adhesive or a fastener, such as by tape, glue, clips, clasps, clamps, pins, or screws.

The supports 568 may be of any suitable size, number, shape, and dimension and made of any suitable material. In one embodiment, the supports 568 are made of mesh, such as a plastic mesh. In another embodiment, the supports 568 are plastic rods. The supports 568 are preferably porous solids in order to provide structural support to the membrane layers 566 while allowing fluid to flow between the supports 568. When permeate solution flows between the supports 568 and feed solution flows on the other side of each membrane layer 566, distillation can occur across each membrane layer 566.

The feed stream can be introduced into the tank 580 by any suitable inlet, such as perforated inlet tubes 582 in the tank 580, such as in the bottom of the tank 580. In a particular implementation, the inlet is configured to evenly distribute feed water in spaces between each cassette 562. In further implementations the inlet is located elsewhere in the tank 580 or is an inlet other than perforated inlet tubes 582.

From the perforated inlet tube 582, the feed solution is introduced into the feed tank 580 between the membrane cassettes 562. After passing between the cassettes 562, the feed solution exits the tank 580 though an outlet 590.

The permeate stream is introduced into the inside of the cassette 562 through one or more inlet ports 570. After passing though the permeate porous support spacer 568, the permeate stream exits the cassette 562 through the outlets 572. If desired, the permeate stream or feed stream can be passed through the flow cell 560 multiple times. In other embodiments, the permeate stream or feed stream is removed from the system after one pass through the flow cell 560.

The disclosed methods and systems (generally referred to as VEDCMD) may be used in a variety of applications. VEDCMD can be used to remove salt from water, such as seawater or brackish water. However, VEDCMD can provide a number of advantages compared to previous desalination techniques. As previously noted, salt content typically has great effect on the flux of reverse osmosis systems, but has very little on typical VEDCMD systems. Even at high salt concentrations, at least certain VEDCMD systems provide high salt rejection, such as higher than 98%.

VEDCMD systems can be operated comparatively inexpensively. Only a small temperature differential (for example, 10° C.) can result in substantial flux. The disclosed systems may be combined with a waste heat source, such as power plant or factory, to provide the desired temperature differential.

Similarly, VEDCMD systems can require comparatively little capital cost. The lower pressure pumps used for the feed cycle and the permeate cycle are relatively inexpensive to purchase and operate, in contrast to the high pressure pumps typically used in reverse osmosis systems.

In addition, in at least certain embodiments, VEDCMD produces comparatively less membrane fouling because foulants are not pushed into the pores of the membranes at the relatively mild pressures used. Because of the durability of the membranes, maintenance costs involved in removing and replacing membranes may also be reduced.

In addition to treatment of water with dissolved sodium chloride, water containing other salts, or inorganic solutes, may be desalinated using VEDCMD. For example, water contaminated with heavy metals, arsenic or other containments can be subjected to VEDCMD, thus providing cleaner water and a more concentrated feed stream. A more concentrated feed stream may lead to more efficient subsequent purification or storage.

Various types of wastewater may be purified using VEDCMD. In a particular application, human waste fluids may be purified and the recovered water reused. For example, on long space voyages it is impractical to bring along enough pure water to last for the duration of the voyage. VEDCMD provides both a way to provide fresh water and for reducing the volume of waste created during the voyage. VEDCMD is particularly suited for this application because the vapor pressure of urea is very low and therefore urea will not cross the membranes typically used.

VEDCMD may find application in the food industry. VEDCMD may be used to concentrate beverages, such a soft drinks and juices, for later reconstitution. Foods such as soups may be similarly concentrated. A variety of useful concentrates may be prepared by VEDCMD, such as converting tomato juice to ketchup. These methods may be more energy efficient, produce less waste, and produce a higher quality product than previous preparation methods.

VEDCMD may be used in the biotechnical and biochemical fields in extracting, purifying, or concentrating various items of interest. For example, many biological substances, such as cells, proteins, and microorganisms, are sensitive to pressure or temperature. Because of the relatively mild temperatures and pressures typically used in VEDCMD, these biological substances can be safely concentrated, extracted, or purified.

Although many of the systems described have utilized water feed and permeate solutions, any suitable liquid may be used and the permeate may be other than water vapor. For example, VEDCMD may be used to strip volatile organic compounds from water.

EXAMPLE 1

A series of experiments were performed to test the operation of a test flow cell, generally configured as shown in FIGS. 1 and 2. A test flow cell was constructed from two acrylic blocks. Each block was engraved with three flow channels. Each flow channel was 2 mm wide, 3 mm deep, and 200 mm long. This flow cell provided a total active membrane area for mass transfer of 12 $cm^2$.

The feed solution was continuously pumped from a feed reservoir (a Water Bath 284 from Precision Scientific of Winchester, Va.) through a vertically oriented test flow cell and back to the feed reservoir. The feed solution was constantly heated to within 0.5° C. of the desired feed temperature. Distilled deionized water was similarly recirculated in the permeate cycle and was cooled to within 0.5° C. of the desired permeate temperate with a heat exchanger fed by a water chiller (an ISOTEMP 1023S, available from Fisher Scientific of Pittsburgh, Pa.).

The pressures of the feed cycle and the permeate cycle loop were measured at corresponding locations using thermocouples (model 600-1040 T-type dual channel digital thermocouple thermometers available from Barnant Co. of Barrington, Ill.) and pressure gauges (diaphragm pressure gauges or vacuum gauges, respectively, available from Fisher Scientific of Pittsburgh, Pa.). The flow rates of the feed loop and the permeate loop were measured by flow meters (K71 rotometers available from King Instrument Co. of Huntington Beach, Calif.), respectively. The flow rates of the feed loop and the permeate loop were kept similar at all times.

The membrane, selected from the materials listed in Table 1, was cut from a dry flat sheet of suitable material and installed in the test flow cell. The feed solution was prepared and heated to the desired temperature and the permeate solution in the permeate reservoir was cooled to 20° C.

Sample feed solutions were prepared using certified ACS grade NaCl from Fisher Scientific of Pittsburgh, Pa. and Instant Ocean Synthetic Sea Salts available from Aquarium Systems, Inc. of Mentor, Ohio. Test feed solutions contained between 0.6 and 73 g/l of salt.

Using the above described system, a first series of experiments measured the effects of stream velocity, temperature differential across the membrane, and positive pressure of the feed or permeate cycles on the water flux across the membrane for one or more of the membranes listed in Table 1. The results are summarized in FIGS. 6-8.

Figure 7:
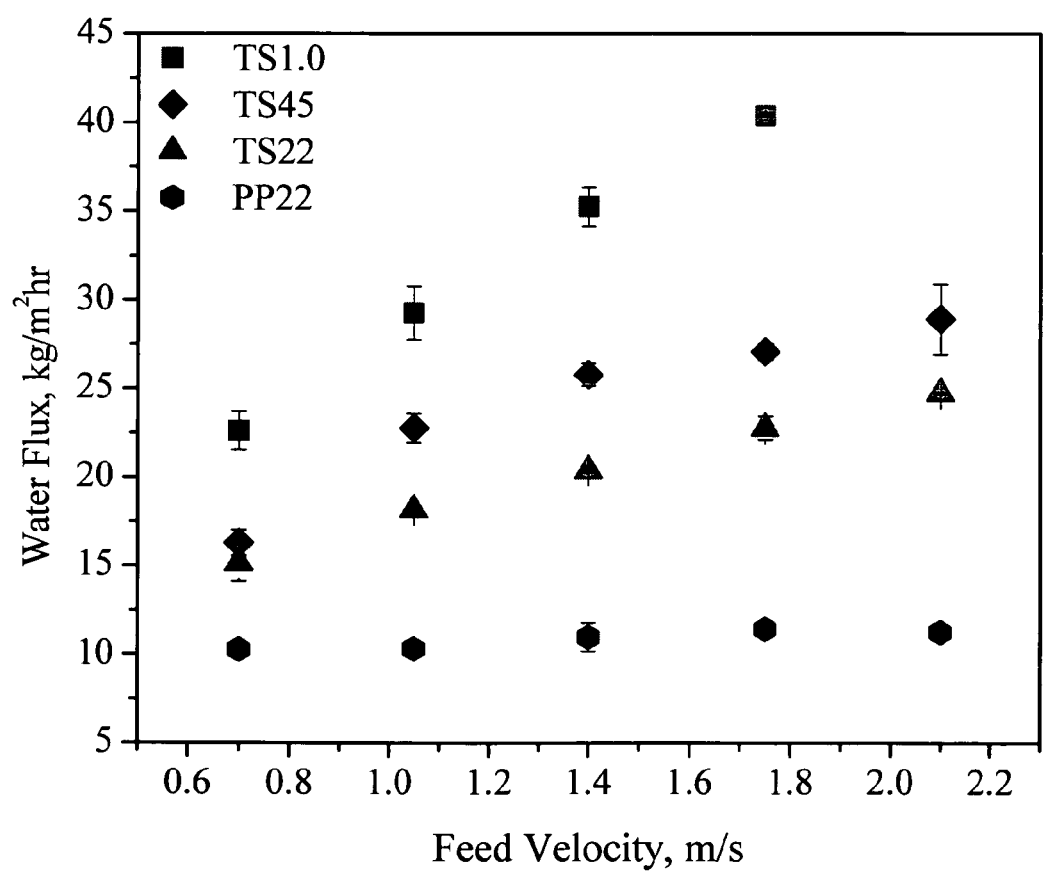
FIG. 7 is a graph of flux across a membrane in a flow cell according to an embodiment of the disclosure as the feed stream velocity is varied, with no vacuum applied to the permeate or feed streams.

As shown in FIG. 7, a graph of the water flux versus the feed velocity, the flux generally increased as the feed flow velocity increased. During the experiment, the feed and permeate solutions were maintained at 40° C. and 20° C., respectively, and the salt concentration was 0.6 g/l NaCl.

Without being bound to a particular theory, it is believed that the increase in flux occurs due to better mixing at higher feed velocities. It was also observed that flux increases with increasing pore size of the membrane.

Figure 8:
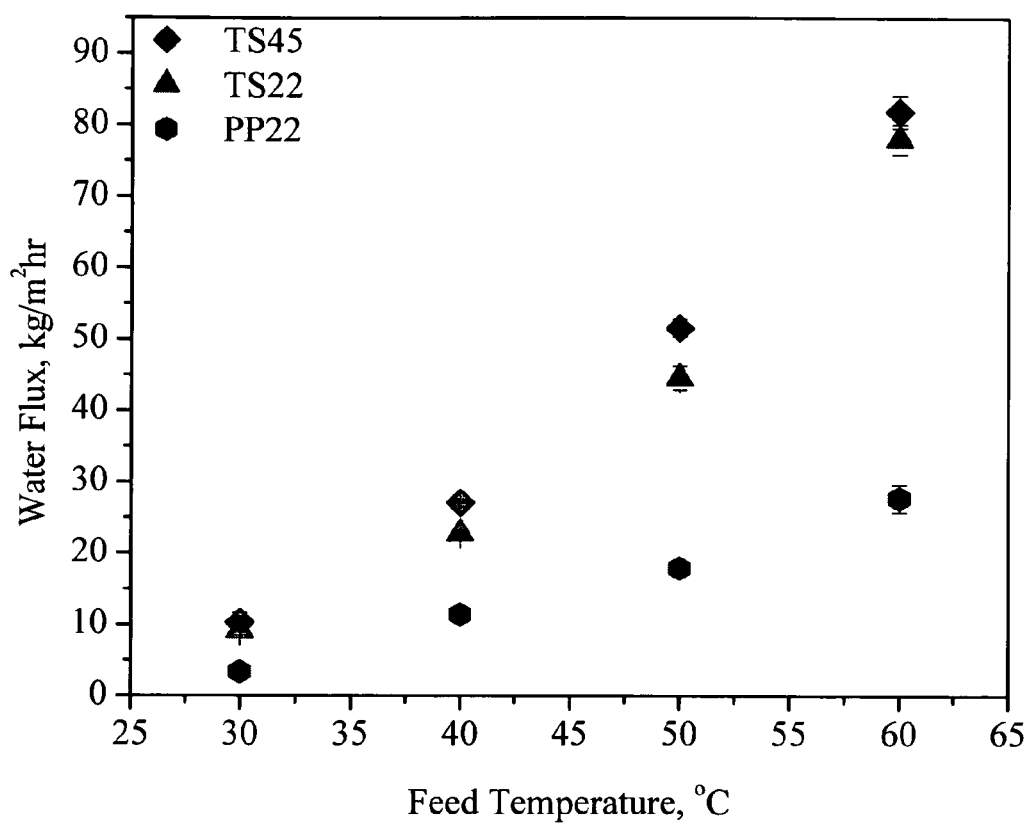
FIG. 8 is a graph of flux across a membrane in a flow cell according to an embodiment of the disclosure as the temperature of the feed stream is varied, with no vacuum applied to the permeate or feed streams.

Turning now to FIG. 8, it can be seen that flux increased as the temperature of the feed solution increased (the temperature of the permeate solution being held constant at 20° C.). During the experiments, the feed and permeate solution velocities were 1.75 m/s and the salt concentration of the feed solution was 0.6 g/l NaCl.

For membranes TS45 and TS22, the flux increase is likely due to the increased vapor pressure of water as the temperature increases. The smaller flux increase for membrane PP22 is likely due to the thickness of the membrane.

Figure 9:
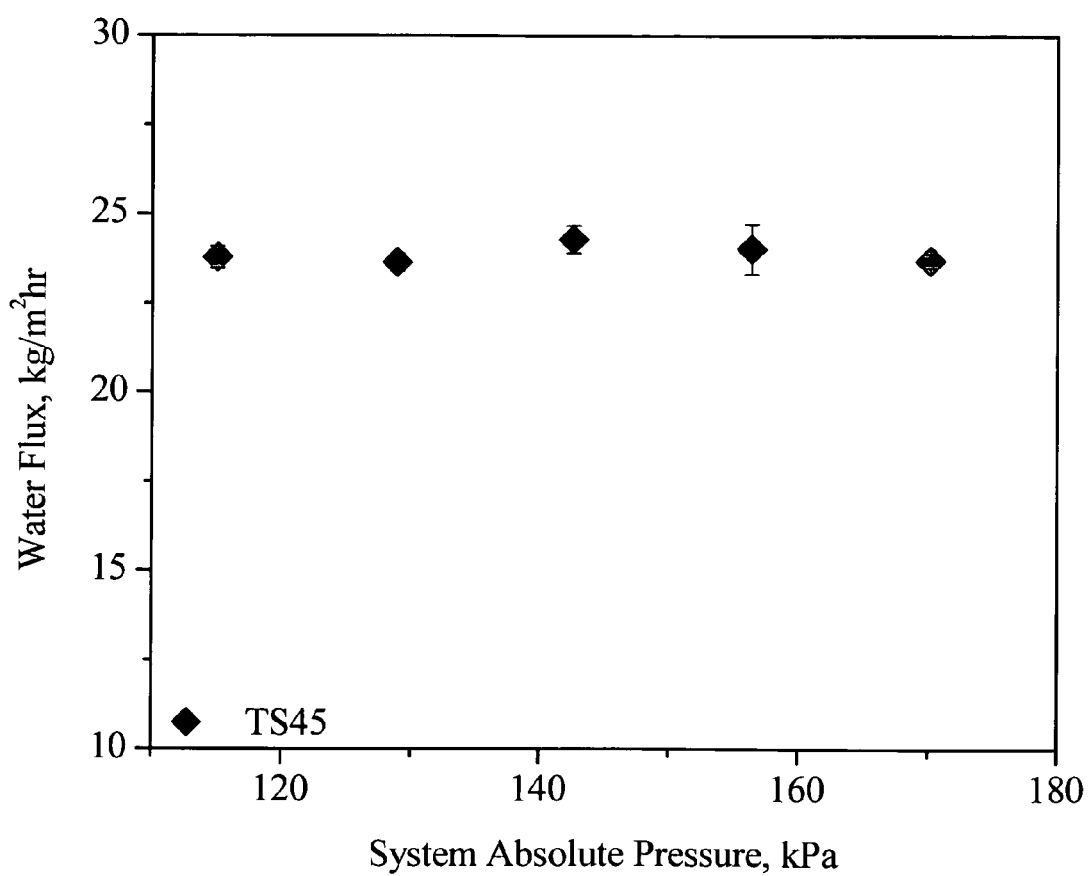
FIG. 9 is a graph of flux across a membrane in a flow cell according to an embodiment of the present disclosure as the pressure applied to the total system is varied, with no vacuum applied to the permeate of feed streams.

With reference to FIG. 9, it was found that operating the system under a positive pressure had almost no effect on the flux across the membrane. During the experiment, the feed and permeate solutions had velocities of 1.05 m/s and were maintained at 40° C. and 20° C., respectively. The salt concentration of the feed solution was 0.6 g/l NaCl.

Figure 10:
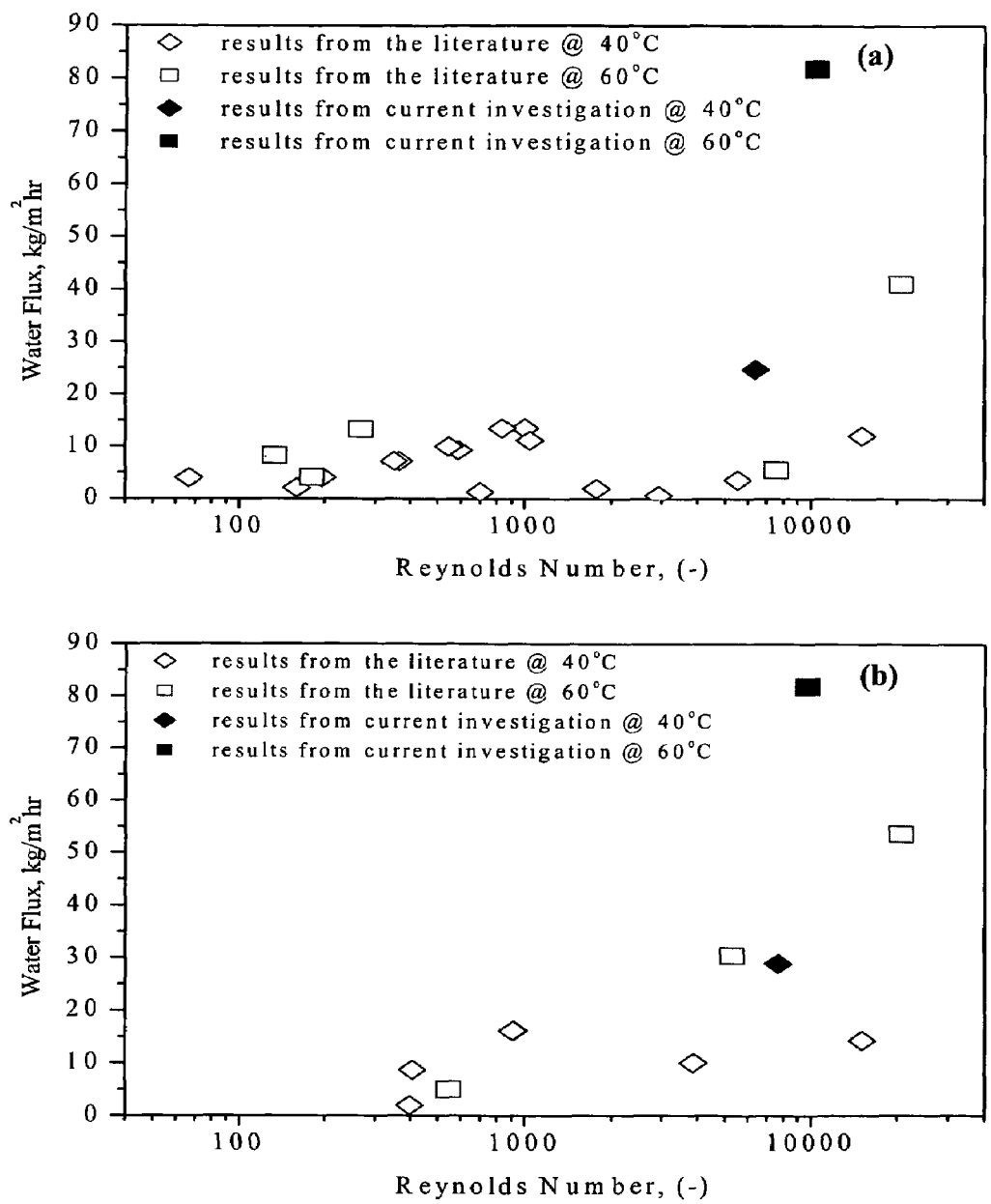
FIGS. 10(a) and 10(b) are graphs of flux versus Reynolds number for systems of the present disclosure and reference literature systems using 0.22 micron membranes and 0.45 micron membranes, respectively.

In order to evaluate the mixing efficiency of the system using the test flow cell, the Reynolds number of the test flow cell was determined for various membranes and compared to previously reported systems. FIG. 10(*a*) illustrates the Reynolds numbers obtained for systems using 0.22 μm membranes compared to literature values for such membranes. Similarly, FIG. 10(*b*) illustrates the Reynolds number obtained for systems using 0.45 μm membranes compared to literature values for such membranes. In all cases, the test flow cell produced high fluxes and high Reynolds numbers compared to previously reported systems.

Figure 11:
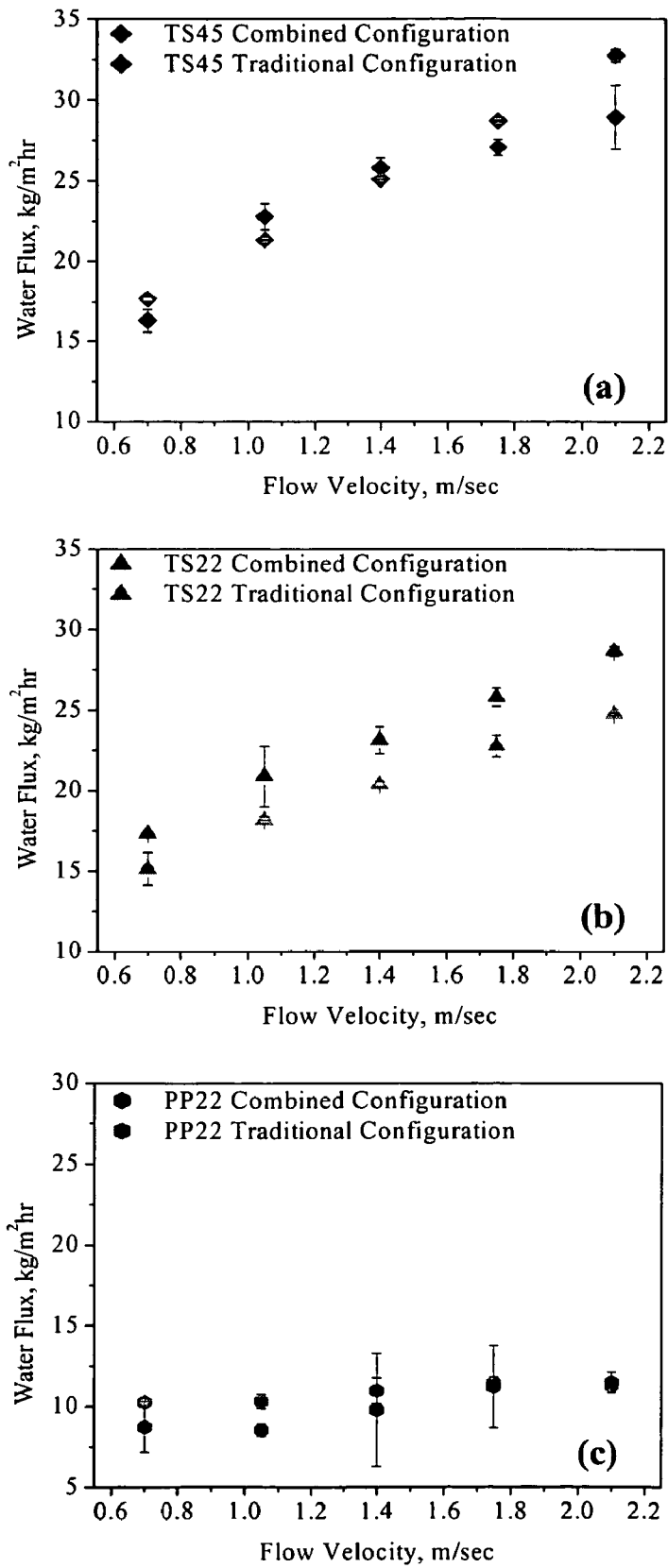
FIGS. 11(a)-11(c) are graphs of flux versus flow velocity for systems of the present disclosure operated with vacuum applied to the permeate solution and with no vacuum applied to the permeate solution for TS45, TS22, and PP22 membranes, respectively.

With an understanding of how the test system compares to previous DCMD (direct contact membrane distillation) techniques, the system using the test flow cell was evaluated under different operating conditions. In a first experiment, the test flow cell was operated under slightly negative pressure, the permeate loop was operated at a pressures of 94 and 108 kPa, a variety of flow velocities, a feed temperature of 40° C., and a permeate temperature of 20° C. The results of this test on three different membranes are shown in FIG. 11. The salt concentration of the feed solution was 0.6 g/l NaCl.

FIGS. 11(*a*)-11(*c*) illustrate flux versus flow velocity for flow cells using TS45, TS22, and PP22 membranes, respectively. At least for certain membranes, the present method resulted in larger fluxes, up to 15% larger, compared to the prior DCMD technique. When energy is defined as the product of the pressure and the flow rate, the increase in flux using the vacuum technique occurs with no additional input of energy.

Figure 12:
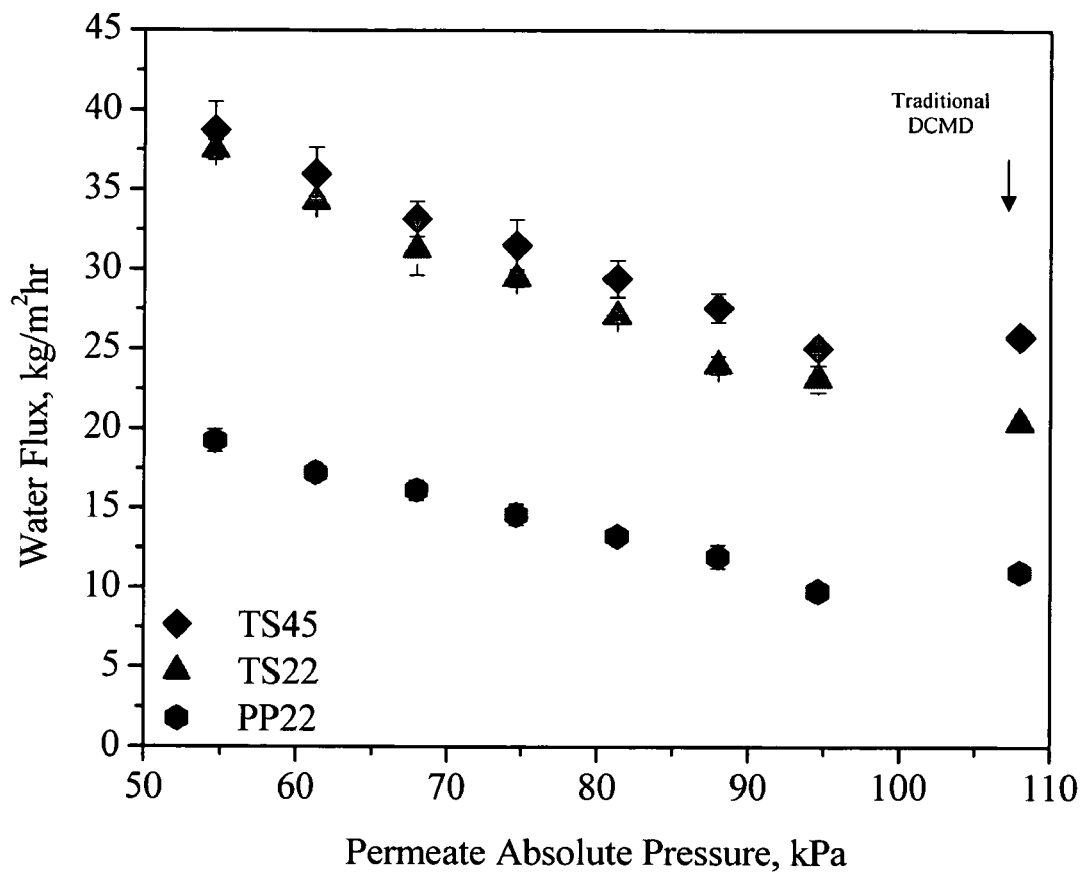
FIG. 12 is a graph showing, for an embodiment of a system according to the present disclosure using three different membranes, the change in flux as the vacuum applied to the permeate solution is increased.

FIG. 12 illustrates the effect of decreasing the pressure (increasing the vacuum) applied to the permeate cycle on the flux. The feed and permeate stream velocities were 1.4 m/s and were maintained at 40° C. and 20° C., respectively. The salt concentration of the feed solution was 0.6 g/l NaCl. For each of the three membranes tested, the flux increased linearly as the permeate absolute pressure decreased.

Without being tied to a particular theory of operation, it is believed that the increased flux at lower permeate loop pressures results, at least in part, from the elimination of air from the pores of the membrane. The presence of air in the pores of the membrane may result in increased resistance to the flow of vapors across the membrane. Other factors that may contribute to the increase flux at lower permeate loop pressures include mitigation of temperature polarization effects across the membrane, increased convective mass transport in the pores due to the total pressure gradient in the pore, and reduced conductive heat loss through the test flow cell.

The effect of the salt concentration of the feed solution on the flux across three of the membranes was also studied. Feed solutions containing from 0.6 to 73 g/l of NaCl or sea salt concentration were prepared. The test system, using test flow cell, was set at a permeate loop pressure of 68 kPa. The flow velocity of the feed and permeate solutions was 1.4 m/s, the feed solution was maintained at 40° C., and the permeate solution was maintained at 20° C. The results are shown in FIG. 12.

Figure 13:
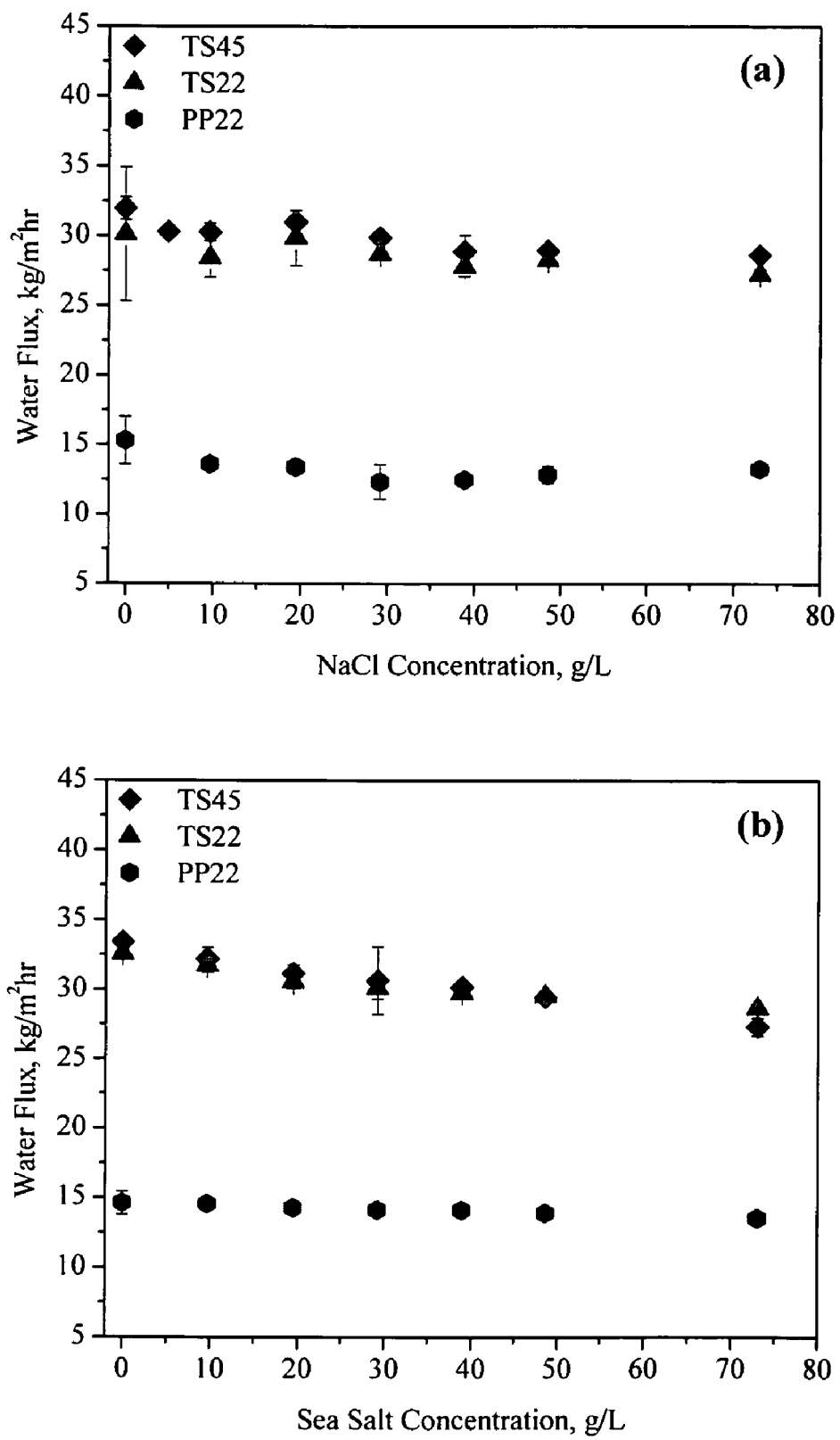
FIGS. 13(a) and 13(b) are graphs showing, for a system of the present disclosure using three different membranes, the change in flux as the salt concentration of the feed solution is varied.

FIG. 13(*a*) is a graph of flux versus NaCl concentration for flow cells using TS45, TS22, and PP22 membranes. FIG. 13(*b*) is a graph of flux versus sea salt concentration for these membranes. As the salt concentration increased, the flux decreased for all membranes tested. However, the average decrease was only about 9%. This decrease is significantly less than prior desalination techniques. For example, reverse osmosis desalination undergoes an 85% flux decrease as the feed solution is changed from pure water to a solution with 70 g/l of NaCl.

EXAMPLE 2

According to further embodiments of the present disclosure, a system 600 can be operated while applying vacuum to both the feed cycle 150 and the permeate cycle 160. The system, illustrated in FIG. 14, may be configured as in FIG. 1. However, an additional front control valve 610 is added to help control the pressure of the feed cycle 150. The pump 120, or another pump, may be used to place the feed loop 150 under a vacuum, such as a pressure lower than ambient pressure.

An experiment was performed testing three membranes in co-current flow mode (the feed and permeate solutions flow in the same direction) with vacuum applied to both the feed cycle and the permeate cycle. In order to compare the effect of fluid flow on the flux, two additional experiments were performed. One experiment was run in co-current mode with vacuum applied only to the permeate cycle. The other experiment was run in countercurrent (the feed and permeate streams flow in opposite directions) flow mode with vacuum applied only to the permeate cycle. In all experiments, the feed and permeate solutions had a velocity of 1.4 m/s and were maintained at 40° C. and 20° C., respectively.

Figure 14:
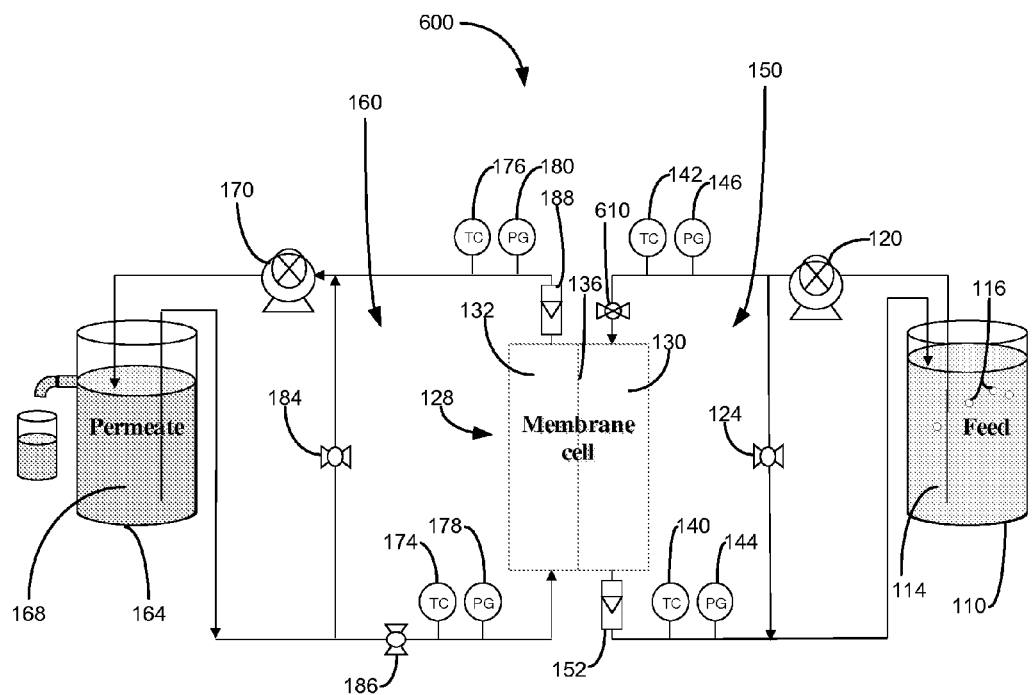
FIG. 14 illustrates a vapor enhanced direct contact membrane distillation system according to an embodiment of the present disclosure whereby vacuum may be applied to both a permeate stream and a feed stream.
Figure 15:
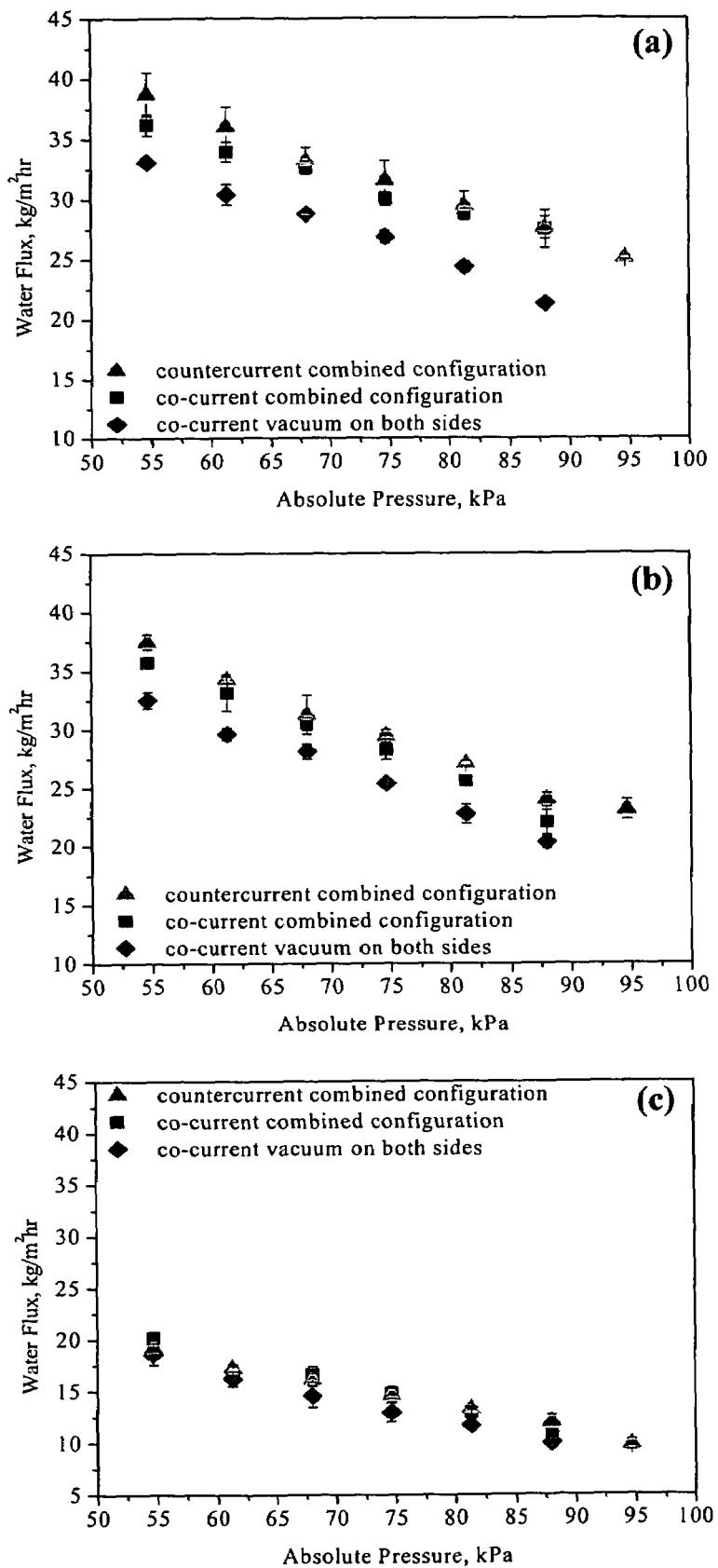
FIGS. 15(a)-15(c) are graphs of flux versus absolute pressure for systems according to the present disclosure under conditions of: vacuum applied to the permeate side only with permeate and feed solutions flowing co-currently, vacuum applied to the permeate side only with the permeate and feed solutions flowing countercurrently, and vacuum applied to the permeate and feed solutions with the permeate and feed solutions flowing co-currently. For FIGS. 15(a), 15(b), and 15(c), the membranes are TS45, TS22, and PP22, respectively.

FIGS. 15(*a*)-15(*c*) are graphs of flux versus absolute pressure for flow cells using the TS45, TS22, and PP22 membranes, respectively. Each graph presents data for a countercurrent configuration, a co-current configuration, and a co-current configuration with vacuum applied to both sides. As shown in FIG. 14, in all experiments, flux increased as pressure decreased. Of the two experiments with vacuum applied to only the permeate cycle, the countercurrent mode resulted in higher flux. The experiment with vacuum applied to both the permeate cycle and the feed cycle resulted in lower flux than either of the permeate cycle vacuum only experiments.

It is to be understood that the above discussion provides a detailed description of various embodiments. The above descriptions will enable those skilled in the art to make many departures from the particular examples described above to provide apparatus constructed in accordance with the present invention. The embodiments are illustrative, and not intended to limit the scope of the present invention. Changes may be made in the construction and operation of the various components, elements and assemblies described herein and changes may be made in the steps or sequence of steps of the methods described herein. The scope of the present invention is rather to be determined by the scope of the claims as issued and equivalents thereto.

What we claim is:

1. A liquid extraction system comprising:
    a feed source configured to supply a feed stream having a first pressure and comprising a solvent;
    a permeate source comprising an inlet and a fluid at a second pressure and configured to supply a permeate stream;
    a flow cell comprising a feed inlet, a feed outlet, a permeate inlet, a permeate outlet, and
    a membrane, the flow cell coupled to the feed source and the permeate source such that the membrane is intermediate, and may be placed in contact with, the feed and permeate streams;
    a flow pump in communication with the feed source, whereby the flow pump causes the feed stream to flow on the membrane;
    a vacuum pump operatively coupled to the permeate outlet of the flow cell and to the inlet of the permeate source, whereby the vacuum pump draws a vacuum on the permeate stream and the permeate side of the flow cell, causing permeate to flow from the permeate source, though the permeate inlet of the flow cell into the flow cell, and from the permeate outlet of the flow cell back into the permeate source;
    whereby a partial vapor pressure differential is induced across the membrane by a temperature differential between the feed and permeate streams and a differential between the first and second pressures, causing solvent to evaporate from the feed stream, pass through the membrane, and condense in the permeate stream flowing through the flow cell.

2. The system of claim 1, wherein the temperature of the feed stream is higher than the temperature of the permeate stream.

3. The system of claim 1, wherein a solute is dissolved in the feed stream.

4. The system of claim 3, wherein the solute comprises sodium chloride.

5. The system of claim 3, wherein the solute comprises sea salt.

6. The system of claim 1, wherein the feed stream is selected from the group consisting of treated wastewater, liquid foods, biological substances, runoff water, and seawater.

7. The system of claim 1, wherein the permeate stream is selected from the group consisting of distilled deionized water, potable water, and water having relatively low total dissolved solids.

8. The system of claim 1, wherein the permeate stream and the feed stream each have a flow velocity and the flow velocity of the permeate stream is at least approximately equal to the flow velocity of the feed stream.

9. The system of claim 1, wherein the feed stream runs countercurrent to the permeate stream.

10. The system of claim 1, wherein the membrane is microporous.

11. The system of claim 1, wherein the membrane is hydrophobic.

12. The system of claim 11, wherein the hydrophobic membrane is a composite membrane comprising a polytetrafluoroethylene active layer and a polypropylene support sublayer.

13. The system of claim 11, wherein the hydrophobic membrane is a symmetric, isotropic membrane made from pure polypropylene.

14. The system of claim 1, wherein the flow pump causes the pressure in the feed stream to be lower than atmospheric pressure.

15. An extraction system comprising:
    (A) a feed cycle configured to supply a feed stream comprising a solvent at a first temperature and a first pressure, the feed cycle comprising
        (i) a feed source;
        (ii) a feed cycle flow pump in communication with the feed source;
        (iii) a feed stream temperature gauge, wherein the feed stream temperature gauge may be placed in communication with the feed stream;
        (iv) a feed stream flow meter, wherein the feed stream flow meter may be placed in communication with the feed stream;
    (B) a permeate cycle configured to supply a permeate stream at a second temperature and a second pressure, the second temperature being lower than the first temperature, the permeate cycle comprising:
        (i) a permeate source comprising an inlet and an outlet;
        (ii) a permeate cycle vacuum pump comprising an inlet and an outlet, the permeate cycle vacuum pump outlet operatively coupled to the inlet of the permeate source, the permeate cycle vacuum pump configured to draw a vacuum on the permeate stream, causing the second pressure to be lower than the first pressure;
        (iii) a permeate stream temperature gauge, wherein the permeate stream temperature gauge may be placed in communication with the permeate stream;
        (iv) a permeate stream flow meter, wherein the permeate stream flow meter may be placed in communication with the permeate stream;
        (v) a permeate stream pressure gauge; and
    (C) a flow cell, the flow cell comprising:
        (i) a permeate side comprising a permeate inlet and a permeate outlet, the permeate outlet in fluid communication with the inlet of the permeate cycle vacuum pump, the permeate inlet operatively coupled to the outlet of the permeate source and configured to transmit the permeate stream into the permeate side of the flow cell;
        (ii) a feed side comprising a feed inlet, the feed inlet in fluid communication with the feed source and configured to transmit the feed stream into the feed side of the flow cell;
        (iii) a membrane interposed between the permeate side and the feed side and configured to be contacted with the feed stream and the permeate stream;
    whereby a partial pressure differential is induced across the membrane by the differentials between the first and second temperatures and the first and second pressures, causing solvent to evaporate from the feed stream, pass through the membrane, and condense in the permeate stream.

16. The extraction system of claim 15, wherein the feed cycle pump is configured to place the feed stream under vacuum.

17. The extraction system of claim 15, the flow cell further comprising a gasket, the gasket abutting the membrane.

18. The extraction system of claim 15, wherein the membrane is one of a plurality of membranes, further comprising a plurality of gaskets, each of the plurality of gaskets abutting a membrane and forming a stack having a plurality of alternating layers of membranes and gaskets.

19. The extraction system of claim 18, wherein a first portion of the plurality of gaskets are in communication with the feed stream and a second portion of the plurality of gaskets are in communication with the permeate stream, each of the plurality of membranes abutted by a gasket in communication with the permeate stream and a gasket in communication with the feed stream.

20. The extraction system of claim 15, wherein the flow cell comprises a pressure vessel and the membrane is rolled inside the pressure vessel, forming a plurality of membrane layers, each layer being abutted on a first side by the feed stream and being abutted on a second side by the permeate stream.

21. The extraction system of claim 1 wherein the feed stream comprises impaired water.

22. The extraction system of claim 15 wherein the feed stream comprises impaired water.

23. An extraction apparatus comprising:
(A) a flow cell comprising:
  (i) a permeate side comprising a permeate inlet and a permeate outlet;
  (ii) a feed side comprising a feed inlet;
  (iii) a membrane distillation membrane interposed between the permeate side and the feed side;
(B) a flow pump coupled to the feed side of the flow cell;
(C) a permeate source; and
(D) a vacuum pump having an inlet coupled to the permeate outlet and an outlet coupled to the permeate source.

* * * * *